(No Model.) S. M. CHESTER. 2 Sheets—Sheet 1.
VEHICLE RUNNING GEAR.
No. 305,998. Patented Sept. 30, 1884.
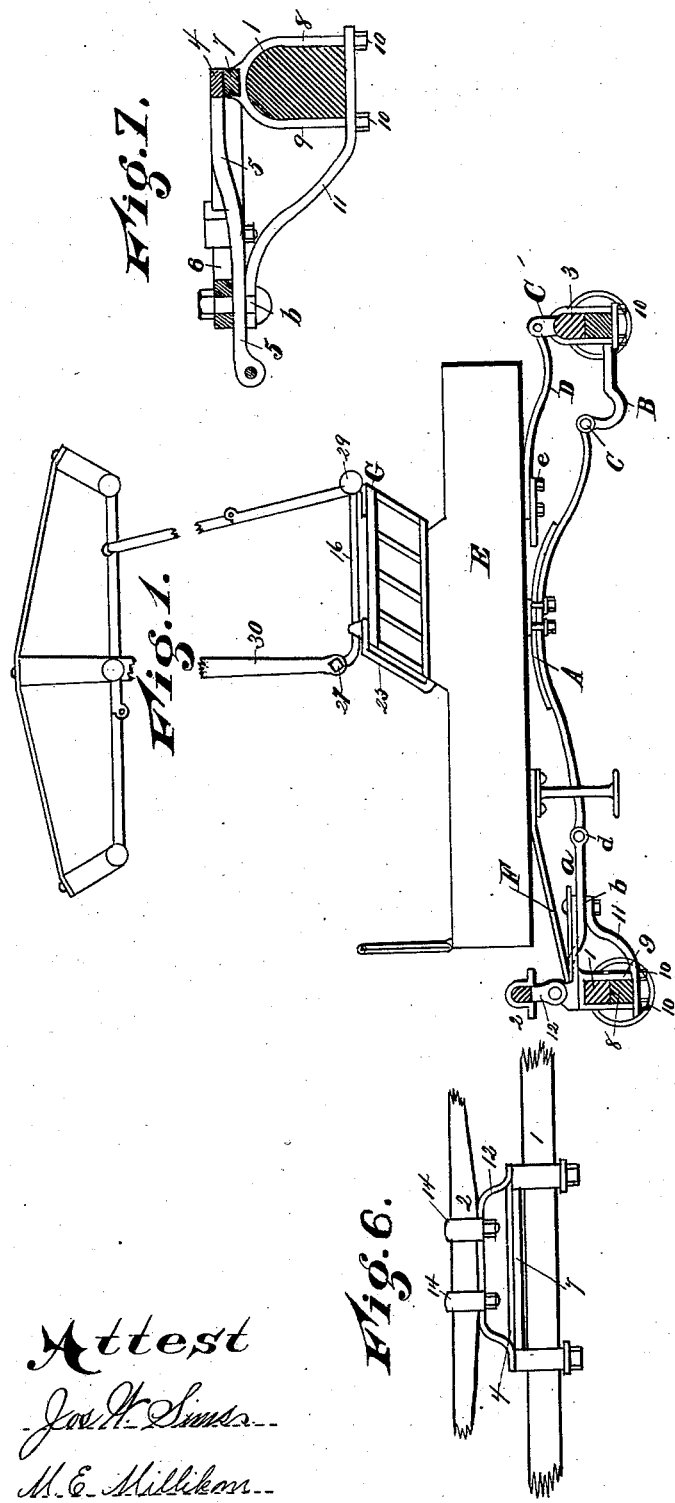
Attest
Jos. W. Sims
M. E. Milliken
Inventor
Samuel M. Chester
by Wood & Boyd
his Attorneys &c (No Model.) 2 Sheets—Sheet 2.
S. M. CHESTER.
VEHICLE RUNNING GEAR.
No. 305,998. Patented Sept. 30, 1884.
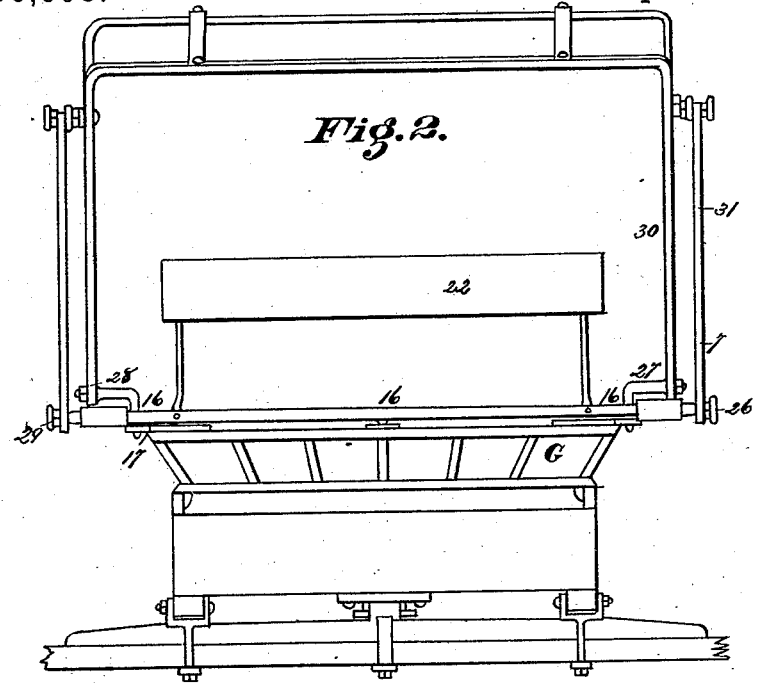
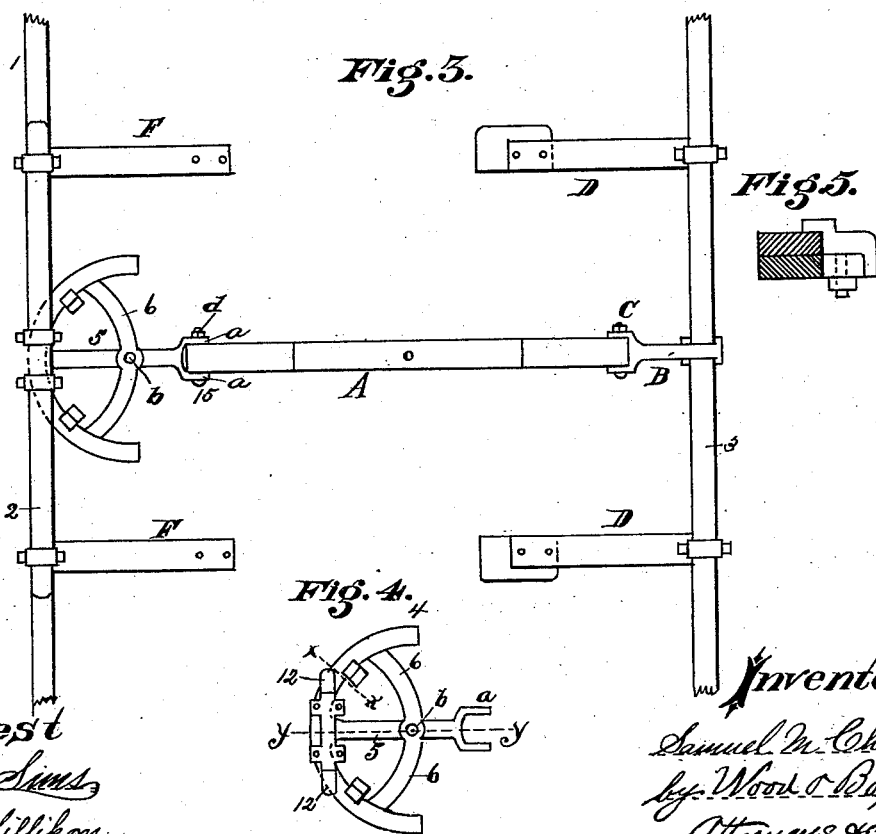
Attest
Jos. W. Sims
M. E. Millikan
Inventor
Samuel M. Chester
by Wood & Boyd
Attorneys

UNITED STATES PATENT OFFICE.

SAMUEL M. CHESTER, OF CINCINNATI, OHIO.

VEHICLE RUNNING-GEAR.

SPECIFICATION forming part of Letters Patent No. 305,998, dated September 30, 1884.

Application filed May 22, 1884. (No model.)

*To all whom it may concern:*

Be it known that I, SAML. M. CHESTER, a citizen of the United States, and a resident of Cincinnati, in the county of Hamilton and State of Ohio, have invented certain new and useful Improvements in Buggies, of which the following is a specification.

My invention relates to an improvement in buggies.

One of the objects of my invention is to equalize the weight of the load upon the springs from front to rear, as well as to cheapen the cost of the springs by lessening the weight of the material employed, due to the equalization of the load upon the different springs. Another object of my invention is to provide an improved fifth-wheel, all of which will be fully set forth in the description of the accompanying drawings, in which—

Figure 1 represents a side elevation, partly in section, of my improved gear and springs. Fig. 2 is a rear elevation of my improvement; Fig. 3, a top plan view of running-gear and fifth-wheel. Fig. 4 is a top plan view of fifth-wheel. Fig. 5 is a detail showing the mode of holding the fifth-wheel together. Fig. 6 is a front elevation of the fifth-wheel, axle, and spring-bar. Fig. 7 is a cross-section on line $y\ y$, Fig. 4.

Numeral 1 represents the front axle; 2, the spring-bars; 3, the rear axle; 4, the fifth-wheel; 5, a coupling-arm connected to the fifth-wheel, which projects from the front center line of the fifth-wheel downward and rearward. The rear end is forked, having limbs $a\ a$, which are pierced with eyes for the reception of a bolt, $d$.

$b$ represents a pivot, which serves as the king-bolt, passing through arms 5, 6, and 11, and forms the center on which they turn.

6 is a brace-arm connected to the two arms of the fifth-wheel 4, which is preferably of arc shape.

7 represents the fifth-wheel bearing, which is secured to the axle by clips 8 and 9, the lower ends of which are screw-threaded, on which engage nuts 10.

11 represents a curved brace-arm, one end of which is pierced to receive the king-bolt, and the forward ends to pass over the screw-threaded ends of clips 8 and 9, so as to rigidly secure the parts to the front axle and form a firm bearing-support.

12 represents a U-shaped coupling-arm, which is formed or united to the clips 8 and 9, and serving as a bearing-support for the spring-bar 2, which is secured thereto by clip 14.

B represents a rear coupling-arm, with a similar fork and bolt, C, as that shown at the front end of spring A for connecting it to the hind axle, 3. These arms 5 and B may be lengthened or shortened, or the spring may be coupled to the fifth-wheel and to the axle by any other well-known means.

D D represent short side springs attached to the axle 3, preferably by short arms C', secured to the clips of the axle.

F represents similar short side springs bolted to the side of the wagon near the front corners, and to the spring-bar 13, in the usual manner of connecting springs to spring-bars.

I claim—

1. The running-gear of a buggy having the spring A, coupling the hind axle to an arm or extension of the fifth-wheel secured to the front axle, substantially as described.

2. The combination of the bearing-plate 7 with the curved fifth-wheel plate 4, having the attached rearward-projecting arm 5, and the brace-arm 6, crossing the said arm and joined to the fifth-wheel plate, the brace-arm 11, connected with the front axle, and the pivot-pin $b$, passing through the arm 5, brace 6, and brace-arm 11, substantially as described.

3. A fifth-wheel composed, substantially, of the coupling-arm 5, brace-arm 6, movable plate 4, and stationary bearing 7, hinging on the king-bolt center $b$, placed in the rear of the front axle, substantially as described.

4. In combination with the spring-coupling A, the coupling-arm 5, secured to the fifth-wheel and bearing on the front axle, and having the rear end of said spring secured to the rear axle, substantially as described.

5. The combination of the bearing-plate 7 with the fifth-wheel plate 4, having the attached rearward-projecting arm 5, the brace-arm 6, crossing the said arm and joining the fifth-wheel plate, and the pivot-pin $b$, passing through the arm 5 and brace-arm 6, substantially as described.

6. In a running-gear, in combination with the body and axles, the short springs F and D, secured to the axles and body, and the coupling-spring A, secured to the arm 5 of the fifth-wheel and hinged to the rear axle, substantially as described.

In testimony whereof I have hereunto set my hand.

SAML. M. CHESTER.

Witnesses:
ROBERT ZAHNER,
M. E. MILLIKOM.